US011037705B2

(12) United States Patent
Turner et al.

(10) Patent No.: US 11,037,705 B2
(45) Date of Patent: Jun. 15, 2021

(54) CLOCKING ANGLE SETTING TOOL FOR A WIRE HARNESS

(71) Applicant: ROLLS-ROYCE plc, London (GB)

(72) Inventors: Samuel J Turner, Poole (GB); Andrew V Mather, Grindleford (GB)

(73) Assignee: ROLLS-ROYCE plc, London (GB)

(*) Notice: Subject to any disclaimer, the term of this patent is extended or adjusted under 35 U.S.C. 154(b) by 300 days.

(21) Appl. No.: 16/156,313

(22) Filed: Oct. 10, 2018

(65) Prior Publication Data

US 2019/0136821 A1   May 9, 2019

(30) Foreign Application Priority Data

Nov. 3, 2017   (GB) .................................. 1718239.5

(51) Int. Cl.
*H01B 13/012* (2006.01)
*H01R 43/052* (2006.01)
(Continued)

(52) U.S. Cl.
CPC ............ *H01B 13/012* (2013.01); *F02P 7/035* (2013.01); *F02P 15/003* (2013.01);
(Continued)

(58) Field of Classification Search
CPC .. H01R 43/015; H01R 43/0582; H01R 43/22; H01R 43/28; H01R 43/052; H01B 13/012; H02G 3/30; F02P 7/035; F02P 15/003; Y10T 29/53222; H01L 313/012; F02C 3/04
See application file for complete search history.

(56) References Cited

U.S. PATENT DOCUMENTS

| 4,032,213 A | 6/1977 | Snyder et al. |
| 4,085,497 A * | 4/1978 | Nijman ................ H01R 43/015 29/566.3 |

(Continued)

FOREIGN PATENT DOCUMENTS

| DE | 20209925 U1 | 9/2002 | |
| EP | 2 800 208 A1 | 11/2014 | |
| JP | 2004165159 A * | 6/2004 | ............. H01R 13/73 |

OTHER PUBLICATIONS

May 3, 2018 International Search Report issued in Patent Application No. GB 1718239.5.
(Continued)

Primary Examiner — A. Deter Tugbang
(74) Attorney, Agent, or Firm — Oliff PLC

(57) ABSTRACT

There is described a clocking angle setting tool for a wire harness having a support arm provided with a clamp for attaching a harness cable of the wire harness to the support; arm, a connector receptacle for receiving a connector provided at the end of the harness cable and a key or keyway for engaging with a complementary keyway or key of the connector. The connector receptacle is spaced from the clamp and is rotatably mounted to the support arm. A locking mechanism for locking an angular position of the connector receptacle relative to the support arm is included. The angular position of the connector receptacle relative to the support arm determines a clocking angle of the connector relative to the harness cable.

10 Claims, 5 Drawing Sheets

(51) Int. Cl.
      *H01R 43/01*       (2006.01)
      *H01R 43/22*       (2006.01)
      *F02P 7/03*         (2006.01)
      *F02P 15/00*       (2006.01)
      *H01R 43/28*       (2006.01)
      *F02C 3/04*         (2006.01)

(52) U.S. Cl.
      CPC ........... *H01R 43/015* (2013.01); *H01R 43/22* (2013.01); *H01R 43/28* (2013.01); *F02C 3/04* (2013.01); *H01R 43/052* (2013.01); *Y10T 29/53222* (2015.01)

(56) References Cited

U.S. PATENT DOCUMENTS

| | | | |
|---|---|---|---|
| 4,692,974 A | | 9/1987 | Cross |
| 10,044,159 B1 * | | 8/2018 | Page .................... H01R 43/22 |
| 2006/0223353 A1 | | 10/2006 | Pittau |

OTHER PUBLICATIONS

Mar. 11, 2019 extended European Search Report issued in European Patent Application No. 18199629.9.
"BETA Backshell/Accessory Tooling Guide". Jan. 1, 2009, 60 pages, Retrieved from the Internet: http://www.pan-pac.com/docs/dmcbackshell.pdf.
Feb. 5, 2020 Search Report issued in European Patent Application No. 18199629.9.

* cited by examiner

CLOCKING ANGLE SETTING TOOL FOR A WIRE HARNESS

The present disclosure concerns a clocking angle setting tool for a wire harness, such as those used in gas turbine engines, and to a method of setting a clocking angle of a connector of a wire harness.

With reference to FIG. 1, a gas turbine engine is generally indicated at 10, having a principal and rotational axis 11. The engine 10 comprises, in axial flow series, an air intake 12, a propulsive fan 13, an intermediate pressure compressor 14, a high-pressure compressor 15, combustion equipment 16, a high-pressure turbine 17, an intermediate pressure turbine 18, a low-pressure turbine 19 and an exhaust nozzle 20. A nacelle 21 generally surrounds the engine 10 and defines both the intake 12 and the exhaust nozzle 20.

The gas turbine engine 10 works in the conventional manner so that air entering the intake 12 is accelerated by the fan 13 to produce two air flows: a first air flow into the intermediate pressure compressor 14 and a second air flow which passes through a bypass duct 22 to provide propulsive thrust. The intermediate pressure compressor 14 compresses the air flow directed into it before delivering that air to the high pressure compressor 15 where further compression takes place.

The compressed air exhausted from the high-pressure compressor 15 is directed into the combustion equipment 16 where it is mixed with fuel and the mixture combusted. The resultant hot combustion products then expand through, and thereby drive the high, intermediate and low-pressure turbines 17, 18, 19 before being exhausted through the nozzle 20 to provide additional propulsive thrust. The high 17, intermediate 18 and low 19 pressure turbines drive respectively the high pressure compressor 15, intermediate pressure compressor 14 and fan 13, each by suitable interconnecting shaft.

A typical gas turbine engine has a substantial number of electrical components which serve, for example, to sense operating parameters of the engine and/or to control actuators which operate devices in the engine.

Electrical power and signals to and from the individual electrical components are commonly transmitted along conductors. Conventionally, such conductors may be in the form of wires and cables which are assembled together in a harness. In such a harness, each wire may be surrounded by an insulating sleeve. The connections between the individual components and the conventional harness are made, for example, by multi-pin plug and socket connectors. Similarly, communication between the harness and power, control and signaling circuitry is achieved through a multi-pin connector.

By way of example, FIG. 2 of the accompanying drawings shows a typical gas turbine engine including two conventional wiring harnesses 102, 104, each provided with a respective connector component 106, 108 for connection to circuitry accommodated within the airframe of an aircraft in which the engine is installed.

The harnesses 102, 104 are assembled from individual wires and cables which are held together over at least part of their lengths by suitable sleeving or braiding. Individual wires and cables, for example those indicated at 110, branch from a main harness section and emerge from the sleeving or braiding to terminate at plug or socket connector components 112 for cooperation with complementary socket or plug connector components 114 on, or connected to, the respective electrical components.

Wiring harnesses are typically relatively rigid which prevents manipulation and twisting of the individual branches and their respective connectors. Wiring harnesses are therefore designed so that the connectors are provided in the correct orientation to interface with the relevant connector without putting stress on the harness cable by forcing the connectors to fit. Corresponding connectors are typically provided with complementary keys and keyways which interface when in the proper orientation. These features therefore provide a datum which can be used to define an angle of the connector relative to the harness cable, referred to as a "clocking angle".

Setting of the clocking angle for each connector is a time-consuming and laborious task and it is common for discrepancies to arise as a result of human error.

It is therefore desirable to addresses the issues highlighted above.

According to an aspect there is provided a clocking angle setting tool for a wire harness comprising: a support arm provided with a clamp for attaching a harness cable of the wire harness to the support arm; a connector receptacle for receiving a connector provided at the end of the harness cable and having a key or keyway for engaging with a complementary keyway or key of the connector, wherein the connector receptacle is spaced from the clamp and is rotatably mounted to the support arm; and a locking mechanism for locking an angular position of the connector receptacle relative to the support arm. The angular position of the connector receptacle relative to the support arm determines a clocking angle of the connector relative to the harness cable.

The locking mechanism may comprise a pair of clamp plates and a base portion of the connector receptacle may be sandwiched between the clamp plates, the clamp plates being movable relative to one another to selectively grip the base portion therebetween.

The clamp plates may be joined by a pair of threaded fasteners.

The locking mechanism may comprise an indexing mechanism which is configured to bias the connector receptacle to a plurality of discrete angular positions.

The indexing mechanism may be a ratchet.

The ratchet may comprise a gear having a plurality of asymmetrical teeth and a pawl which is configured to engage the teeth.

The gear may be formed by a base portion of the connector receptacle.

The discrete angular positions may be 5° increments.

One of the support arm and the connector receptacle may be provided with a dial having a graduated scale and the other of the support arm and the connector receptacle is provided with a pointer for indicating the angular position of the connector receptacle on the graduated scale.

According to another aspect there is provided a method of setting a clocking angle of a wire harness, the method comprising: providing a clocking angle setting tool comprising: a support arm and a connector receptacle which is rotatably mounted to the support arm; setting an angular position of the connector receptacle relative to the support arm; clamping a harness cable of the wire harness to the support arm; attaching a connector provided at the end of the harness cable to the connector receptacle with a key or keyway of the connector engaging with a complementary keyway or key of the connector receptacle; and with the connector receptacle in the set angular position, affixing the harness cable to the connector to set a clocking angle of the connector relative to the harness cable.

The angular position of the connector receptacle may be set before or after attaching the connector to the connector receptacle.

The harness cable may be affixed to the connector using a heat-shrink boot.

The method may further comprise locking the connector receptacle in the set angular position by clamping a base portion of the connector receptacle between a pair of clamp plates.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

Embodiments will now be described by way of example only, with reference to the Figures, in which:

FIG. 3 shows a clocking angle setting tool 24. The clocking angle setting tool 24 is shown in three different sizes which will be described in further detail below.

Figure 1:
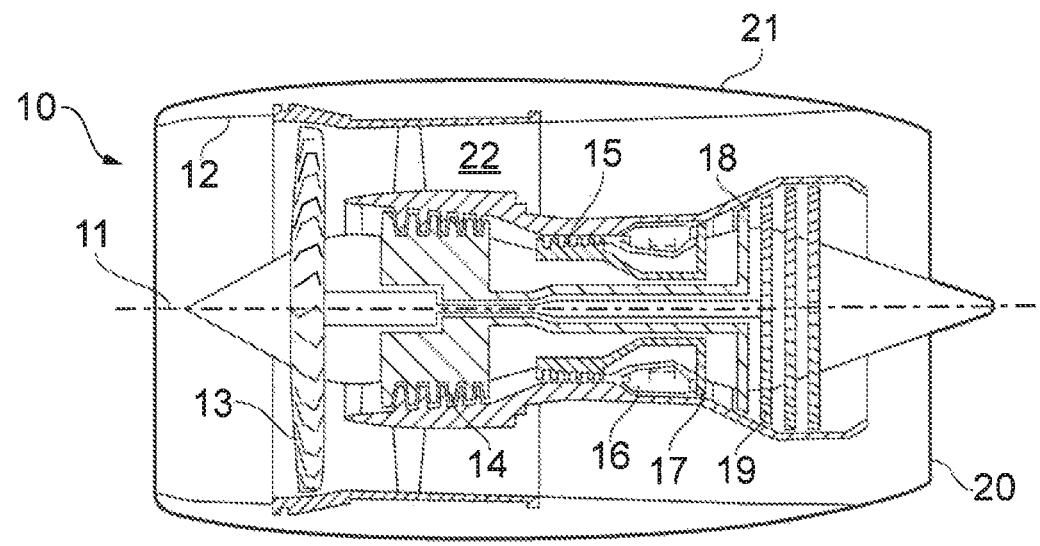
FIG. 1 is a sectional side view of a gas turbine engine.
Figure 2:
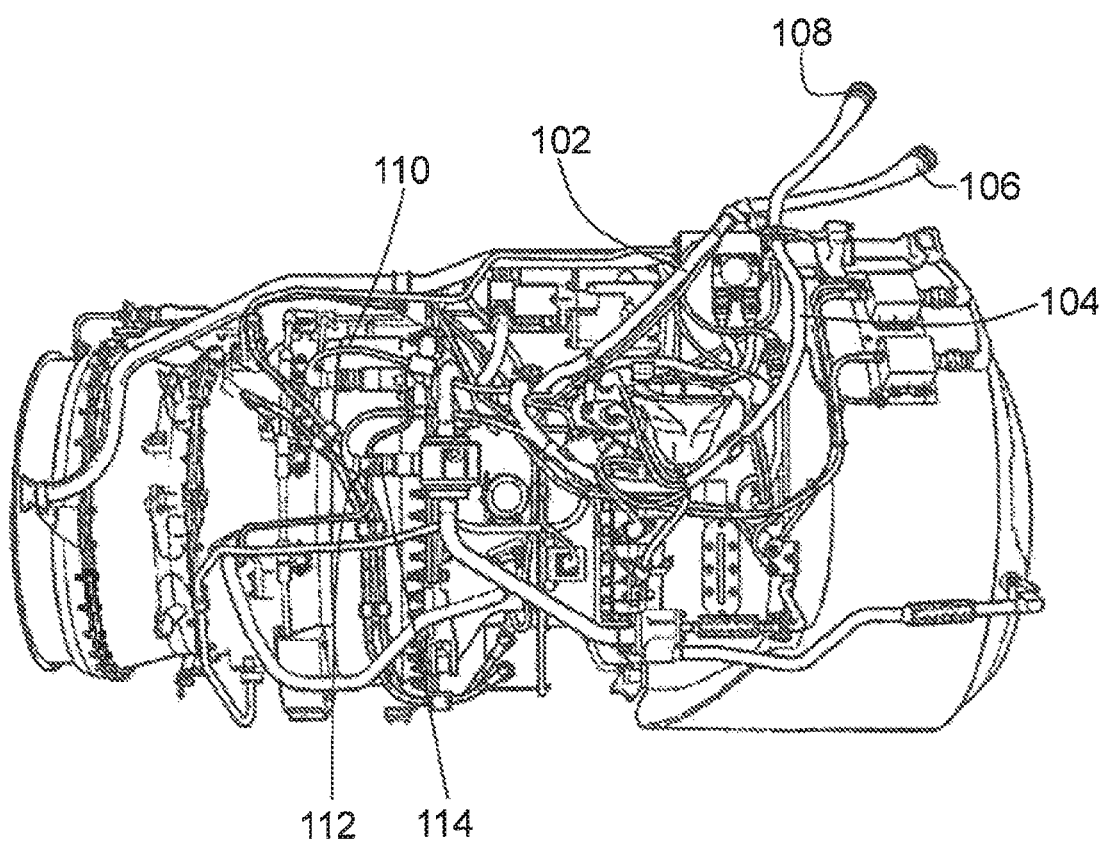
FIG. 2 shows a gas turbine engine with a conventional harness.

The clocking angle setting tool 24 comprises a support arm 26. The support arm 26 comprises a lower portion 28 and an upper portion 30 which are connected via a step such that the lower and upper portions 28, 30 are offset, but parallel to one another. The lower portion 28 carries a connector receptacle 32 towards its distal, free end and spaced from the upper portion 30. The upper portion 30 carries a cable clip 34.

Figure 4:
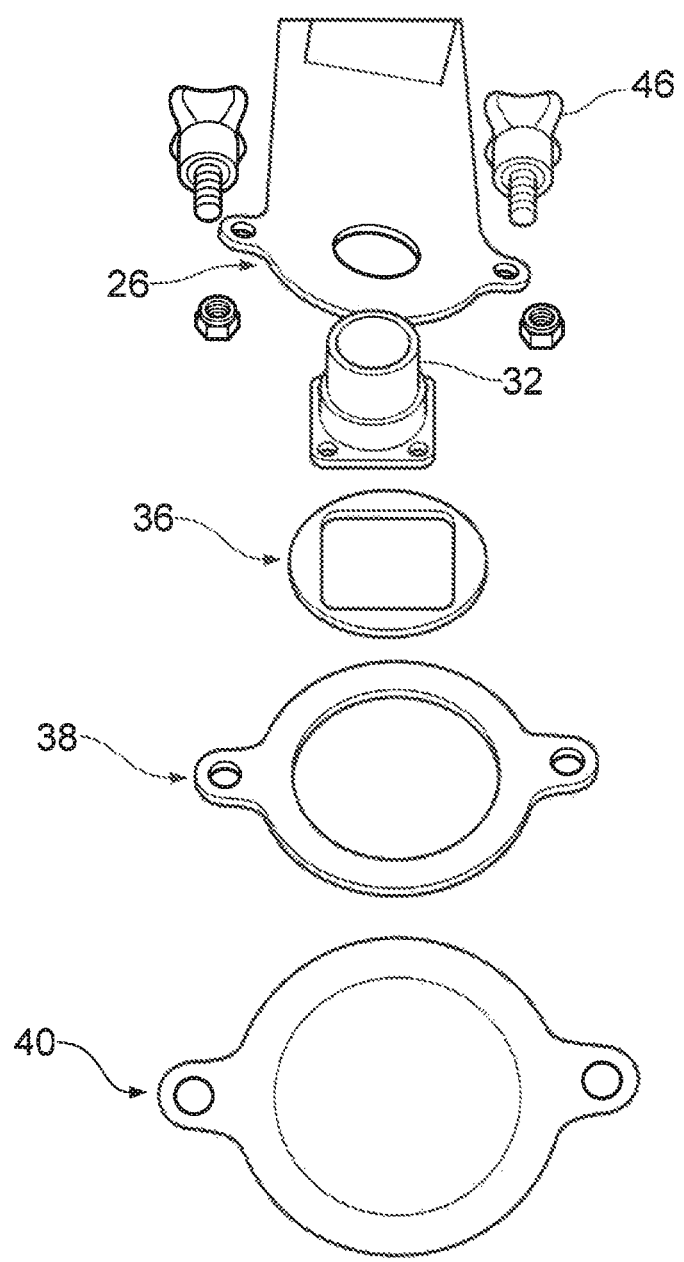
FIG. 4 is an exploded view of the clocking angle setting tool.
Figure 5:
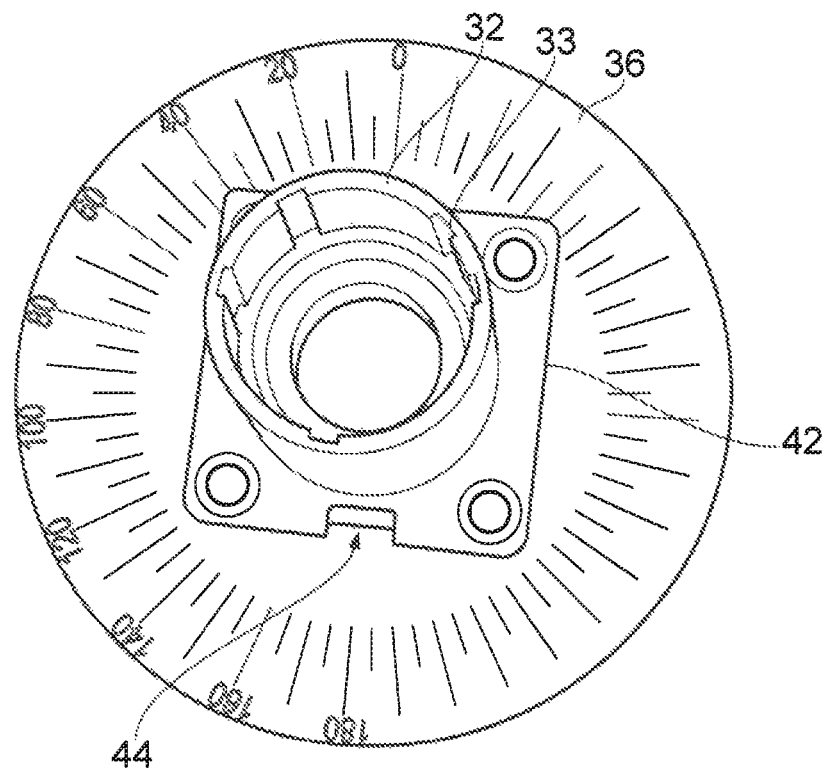
FIG. 5 is a plan view of a connector receptacle of the clocking angle setting tool.

The connector receptacle 32 is mounted to the support arm 26 by an assembly comprising a guide plate 36, a spacer plate 38 and a back plate 40, as is shown in FIG. 4. As shown in FIG. 5, the connector receptacle 32 comprises one or more axially extending keyways 33 (5 are shown). The keyways 33 are provided on an inner surface of the connector receptacle 32 and an outer surface of the connector receptacle 32 is provided with a screw thread. The guide plate 36 comprises a central opening 42 which corresponds to the outer profile of a base portion of the connector receptacle 32, which in this example is square. The base portion of the connector receptacle 32 is received within the central opening 42 of the guide plate 36. The connector receptacle 32 and the guide plate 36 are provided with a poka-yoke feature 44 to ensure that the connector receptacle 32 is only able to fit into the guide plate 36 in a single orientation. Specifically, the central opening 42 is provided with a protrusion and the connector receptacle 32 is provided with a complementary indent, or vice versa.

The outer surface of the guide plate 36 is circular. A circular graduated scale is provided on an upper surface of the guide plate 36, adjacent the outer surface.

The spacer plate 38 is generally in the form of a ring with a circular opening which is sized to receive the guide plate 36 with the connector receptacle 32 located therewithin. The spacer plate 38 is provided with a pair of diametrically opposed lugs which project outwardly and are each provided with a through hole.

The base plate 40 is a solid circular plate which is also provided with a pair of diametrically opposed lugs which project outwardly and are each provided with a through hole.

The support arm 26 has an opening which receives a connector portion of the connector receptacle 32. The opening is sized such that the base portion of the connector receptacle 32 is not allowed to pass therethrough. The assembly is then arranged such that the base portion of the connector receptacle 32 is received within the central opening 42 of the guide plate 36 and the guide plate 36 is received within the spacer plate 38. The guide plate 36 and the connector receptacle 32 are retained within the spacer plate 38 by the base plate 40 which is provided on the opposite side of the spacer plate 38 to the support arm 26. The base plate 40 effectively closes the opening provided in the spacer plate 38. The base plate 40 is affixed to the support arm by a pair of thumbscrews 46 which pass through lugs provided in the support arm 26 and through the aligned lugs of the spacer plate 38 and the base plate 40. The thumbscrews 46 are received by nuts which may be held captive in the lugs of the base plate 40.

The guide plate 36 is rotatable within the spacer plate 38, thus allowing the connector receptacle 32 to rotate relative to the support arm 26.

The base plate 40 is able to clamp the guide plate 36 and/or the base portion of the connector receptacle 32 between its upper surface and a lower surface of the support arm 26. The thumbscrews 46 may therefore be used to grip the base plate 40 and/or the connector receptacle 32 and thus lock the connector receptacle 32 in position, thereby preventing rotation. The assembly therefore forms a locking mechanism, with the base plate 40 and the support arm 26 forming clamp plates.

Figure 6:
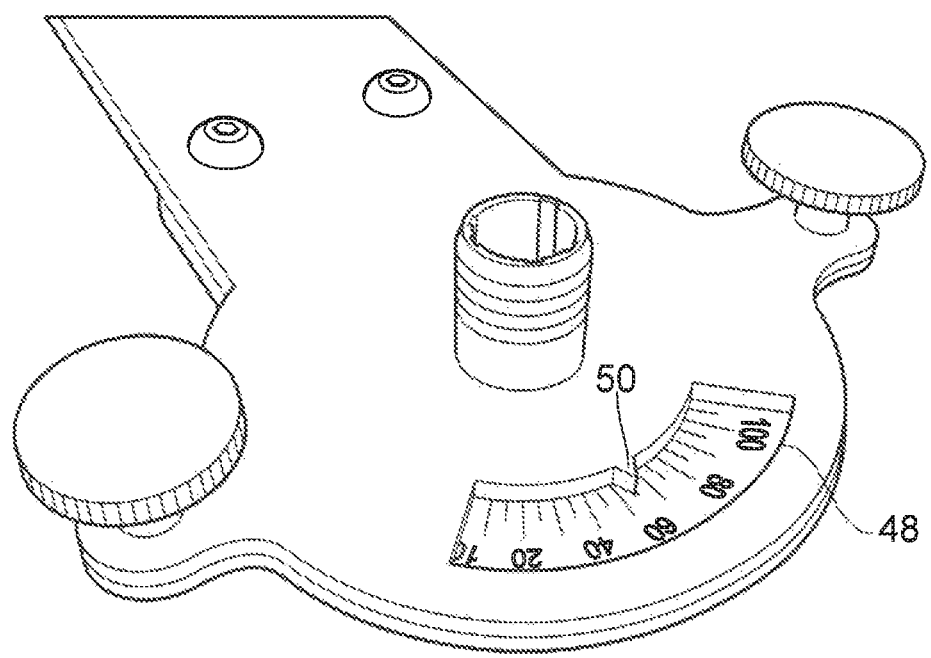
FIG. 6 shows a connector end of the clocking angle setting tool.

As described previously, the upper surface of the guide plate 36 is provided with a circular graduated scale. The scale provides an indication of the angular position of the connector receptacle 32 relative to the support arm 26. The graduations of the scale may be separated by 5° increments and may be provided with specific angle values (shown here in 20° intervals). As shown in FIG. 6, the support arm 26 is provided with an arcuate indicator dial window 48 through which a portion of the scale can be viewed. The indicator dial window 48 is provided with a pointer 50 at its centre which defines a specific value on the scale corresponding to the current angular position of the connector receptacle 32.

The clocking angle setting tool 24 can be used to set the clocking angle of a connector of a wire harness. Specifically, the angular position of the connector receptacle 32 can be set to a required clocking angle, as prescribed by a technical drawing for the wire harness. The angular position may be read from the indicator dial window 48 from the position of the pointer 50 on the scale.

When in the required position, the connector receptacle 32 can be locked in position by tightening the thumbscrews 46 in order to clamp the connector receptacle 32 between the base plate 40 and the support arm 26. With the connector receptacle 32 locked in position, the connector can then be screwed onto the connector receptacle 32. The connector is provided with one or more keys which engage with the keyway 33 formed in the connector receptacle 32. A harness cable connected to the connector is inserted into the cable clip 34 provided on the upper portion 30 of the support arm 26. The cable clip 34 defines a longitudinal axis which is parallel to a longitudinal axis of the support arm 26 and perpendicular to the axis of rotation of the connector receptacle 32. The cable clip 32 therefore fixes the position of the harness cable relative to the connector.

With the connector attached to the connector receptacle 32 and the harness cable affixed to the cable clip 34, the angular position of the connector may be fixed using a heat-shrink boot which engages the cable and connector. The connector and cable can then be disengaged from the clocking angle setting tool 24.

The angular position of the connector receptacle 32 may be set prior to or after attachment of the connector. Further, where it is set prior to attachment of the connector, a blank connector (i.e. without a cable attached) may be used to rotate the connector receptacle 32 into the desired angular position.

Figure 7:
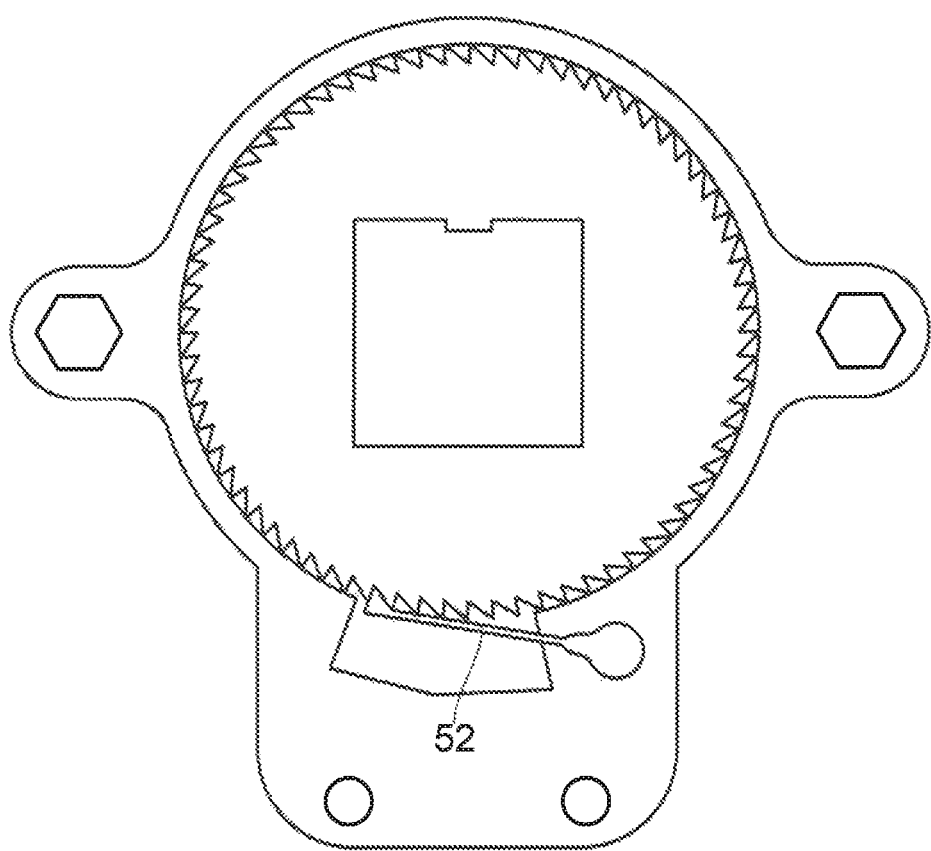
FIG. 7 shows a ratchet mechanism which may be used in the clocking angle setting tool.

Although the guide plate 36 has been described as being freely rotatable within the spacer plate 38, in other examples the rotation of the connector receptacle 32 may be constrained via an indexing mechanism which biases the connector receptacle 32 towards specific angular positions (e.g. 5° increments). Specifically, FIG. 7 shows an alternative arrangement comprising a ratchet mechanism which provides indexing and also allows rotation in only one direction. As shown, the outer surface of the guide plate 36 is provided with a plurality of asymmetrical teeth to form a gear. The number of teeth n determines the angle θ between each position of the ratchet mechanism (e.g. θ=360/n and so n=72 here). The spacer plate 38 is provided with a pawl 52. The pawl 52 is in the form of a cantilevered arm which is provided with a complementary tooth at its distal, free end which selectively engages with one of the teeth on the guide plate 36. The arm may be pivotable and spring-biased or the pawl may rely on bending of the arm itself to provide a biasing force.

The asymmetric shape of the teeth allows the pawl 52 to ride over the teeth, through a deflection of the arm, when the guide plate 36 rotates in one direction (clockwise here), but prevents rotation in the opposite direction. As described previously, the ratchet mechanism also biases the guide plate towards discrete angular positions. Harness specifications typically define clocking angles in 5° increments and so this indexing feature ensures that the connector receptacle 32 moves between these increments and is not able to come to rest in an intermediate position (i.e. between specifiable values).

The engagement of the pawl is designed to ensure there is no play in the mechanism. Accordingly, provided that the user correctly sets the angle, the tool ensures that clocking angle is accurately set to the required value.

The ratchet mechanism may be considered to form part of the locking mechanism since it selectively sets the angular position of the connector receptacle 32. In fact, provided that the resilience of the pawl 52 is sufficient to avoid inadvertent rotation of the connector receptacle 32, the clamping action of the thumbscrews 46 could be removed entirely.

In other examples, the arrangement of the ratchet mechanism may be reversed such that the spacer plate 38 is provided with teeth about its inner surface and the guide plate 36 is provided with a pawl.

Figure 3:
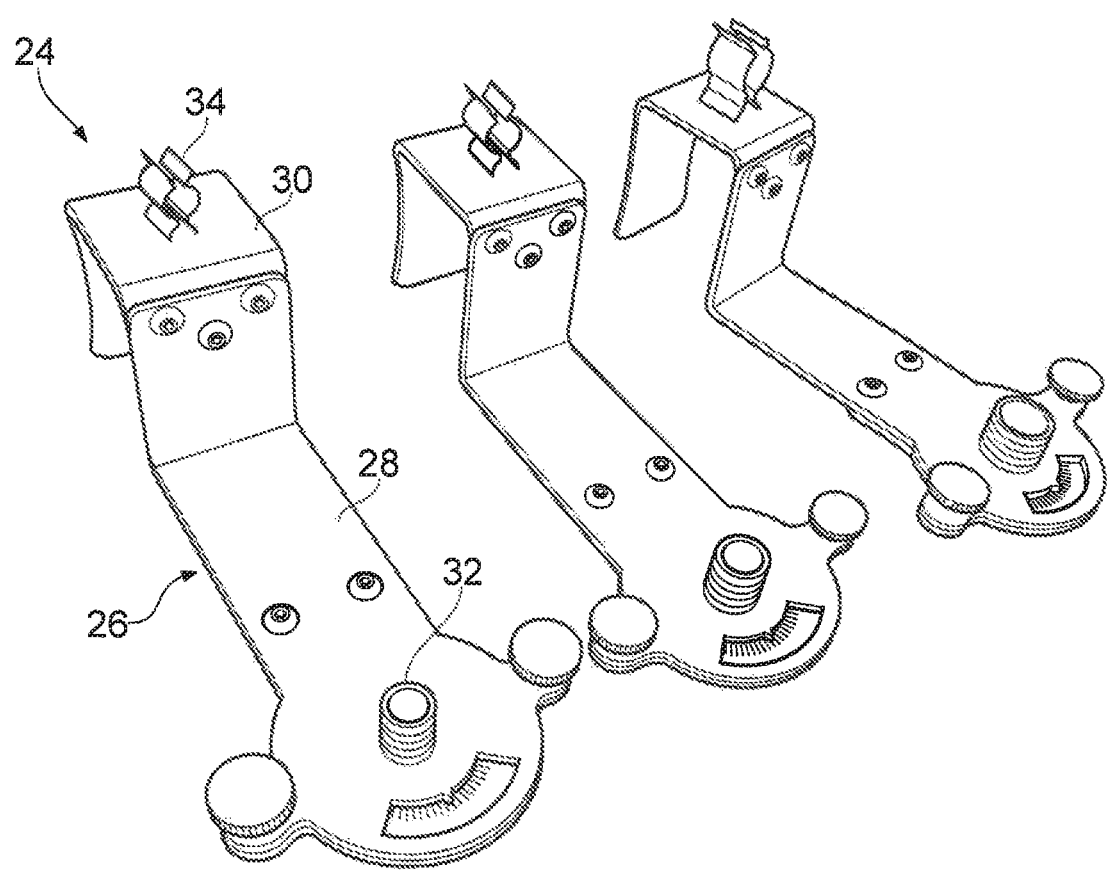
FIG. 3 shows a clocking angle setting tool in three different sizes.

As described previously, FIG. 3 shows the clocking angle setting tool 24 in three different sizes. Specifically, each tool 24 is provided with a connector receptacle 32 of a different size and configured to engage with a different connector. In other examples, the connector receptacle 32 (and possibly also the guide ring 36) may be interchangeable to allow a single tool 24 to be used for different types of connector.

The connector receptacle may carry a male or female connector with the required key or keyways based on the specific application.

In other examples, the connector receptacle 32 and the guide plate 36 may be a single component.

Although specific locking, indexing and ratchet mechanisms have been described herein, it will be appreciated that other suitable arrangements may be used which provide the required functionality.

Although the clocking angle setting tool 24 has been described as having a cable clip 34, it will be appreciated that the cable may be attached to the support arm 26 using any form of clamp.

The clocking angle setting tool ensures that the clocking angle is quickly and accurately set. It therefore eliminates rework and significantly reduces inspection time, thereby reducing the cost of the harness.

The arrangement of the indicator dial may be reversed such that the support arm 26 is provided with the scale and the guide plate 36 has a pointer which indicates the angular position on the scale.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A clocking angle setting tool for a wire harness, comprising:
   a support arm provided with a clamp for attaching a harness cable of the wire harness to the support arm;
   a connector receptacle for receiving a connector provided at the end of the harness cable and having a key or keyway for engaging with a complementary keyway or key of the connector, wherein the connector receptacle is spaced from the clamp and is rotatably mounted to the support arm; and
   a locking mechanism for locking an angular position of the connector receptacle relative to the support arm;
   wherein the angular position of the connector receptacle relative to the support arm determines a clocking angle of the connector relative to the harness cable,
   wherein the locking mechanism comprises an indexing mechanism which is configured to bias the connector receptacle to a plurality of discrete angular positions, and
   wherein the indexing mechanism is a ratchet.

2. A clocking angle setting tool as claimed in claim 1, wherein the locking mechanism comprises a pair of clamp plates and wherein a base portion of the connector receptacle is sandwiched between the clamp plates, the clamp plates being movable relative to one another to selectively grip the base portion between the clamp plates.

3. A clocking angle setting tool as claimed in claim 2, wherein the clamp plates are joined by a pair of threaded fasteners.

4. A clocking angle setting tool as claimed in claim 1, wherein the ratchet comprises a gear having a plurality of asymmetrical teeth and a pawl which is configured to engage the teeth.

5. A clocking angle setting tool as claimed in claim 4, wherein the gear is formed by a base portion of the connector receptacle.

6. A clocking angle setting tool as claimed in claim 1, wherein the discrete angular positions are 5° increments.

7. A clocking angle setting tool as claimed in claim 1, wherein one of the support arm and the connector receptacle is provided with a dial having a graduated scale and the other of the support arm and the connector receptacle is provided with a pointer for indicating the angular position of the connector receptacle on the graduated scale.

8. A method of setting a clocking angle of a wire harness, the method comprising:
   providing a clocking angle setting tool comprising: a support arm and a connector receptacle which is rotatably mounted to the support arm;
   setting an angular position of the connector receptacle relative to the support arm and locking the angular position of the connector receptacle relative to the support arm with a locking mechanism comprising a ratchet which is configured to bias the connector receptacle to a plurality of discrete angular positions;
   clamping a harness cable of the wire harness to the support arm;
   attaching a connector provided at the end of the harness cable to the connector receptacle with a key or keyway of the connector engaging with a complementary keyway or key of the connector receptacle; and
   with the connector receptacle in the set angular position, affixing the harness cable to the connector to set a clocking angle of the connector relative to the harness cable.

9. A method as claimed in claim 8, wherein the harness cable is affixed to the connector using a heat-shrink boot.

10. A method as claimed in claim 8, further comprising locking the connector receptacle in the set angular position by clamping a base portion of the connector receptacle between a pair of clamp plates.

* * * * *